US005960736A

United States Patent [19]
Ludington et al.

[11] Patent Number: 5,960,736
[45] Date of Patent: *Oct. 5, 1999

[54] VACUUM LEVEL CONTROL SYSTEM USING VARIABLE FREQUENCY DRIVE

[75] Inventors: David C. Ludington; Fangjiang Guo, both of Ithaca; James A. Kowalksi, Springville; Roger A. Pellerin, Freeville, all of N.Y.

[73] Assignee: Cornell Research Foundation, Inc., Ithaca, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/843,922

[22] Filed: Apr. 17, 1997

[51] Int. Cl.$^6$ ........................................................ A01J 5/011
[52] U.S. Cl. ............................................................ 119/14.08
[58] Field of Search .............................. 119/14.01, 14.02, 119/14.03, 14.08, 14.14

[56] References Cited

U.S. PATENT DOCUMENTS

| | | | |
|---|---|---|---|
| 4,295,490 | 10/1981 | Boudreau . | |
| 4,616,215 | 10/1986 | Maddalena | 340/626 |
| 4,664,601 | 5/1987 | Uchida et al. | 417/27 |
| 5,141,403 | 8/1992 | Guo et al. | 417/45 |
| 5,284,180 | 2/1994 | Guo et al. | 137/488 |
| 5,568,788 | 10/1996 | Van Den Berg et al. | 119/14.02 |
| 5,845,599 | 12/1998 | Bova et al. . | |

OTHER PUBLICATIONS

"Vacuum Technology & Energy Consideration", David C. Ludington & Roger Pellerin, Proceedings from the National Milking Center Design Conference, Nov. 17–19, 1992; pp. 290–297.

David C. Ludington, et al., "New Electric Technologies for the Dairy Farm", presented at National Food & Energy Council Annual Meeting, Jul. 31 and Aug. 1, 1995; pp. 2–10.

David C. Ludington, et al., "Vacuum Pumps: Types & Controls", Nov. 29, 1995; pp. 1–15.

"Review of data/information for demonstration farms with regard to vacuum pumps", CAEP, Mar. 4, 1996.

First in Vermont, "Variable Speed Control for Dairy Vacuum Pumps", SES Dairy Division. (Undated).

"Progress Report New York State Energy Research & Development Authority", Cornell University, pp. 1–8., Jul. 25, 1995.

"Progress Report, New York State Energy Research and Development Authority", Cornell University, Feb. 14, 1996, pp. 1–7.

"Progress Report New York State Energy Research & Development Authority", Cornell University, pp. 1–6, Aug. 21, 1996.

"Progress Report New York State Energy Research & Development Authority", Cornell University, pp. 1–8, Jun. 12, 1997.

*Primary Examiner*—Thomas Price
*Attorney, Agent, or Firm*—Jones, Tullar & Cooper PC

[57] ABSTRACT

A vacuum control for milking systems includes a vacuum pump driven by an electric motor which is activated by a variable frequency drive (VFD). The VFD is controlled during a milking phase by plc programmable controller and a proportional/integral (PI) controller which respond to a vacuum feedback sensor connected to the milking system. The plc controller differentiates between milk and wash phases and also provides a fixed preset speed control for a washing phase for the milking system. The integrator interfaces between a milk/wash controller and the plc.

9 Claims, 1 Drawing Sheet

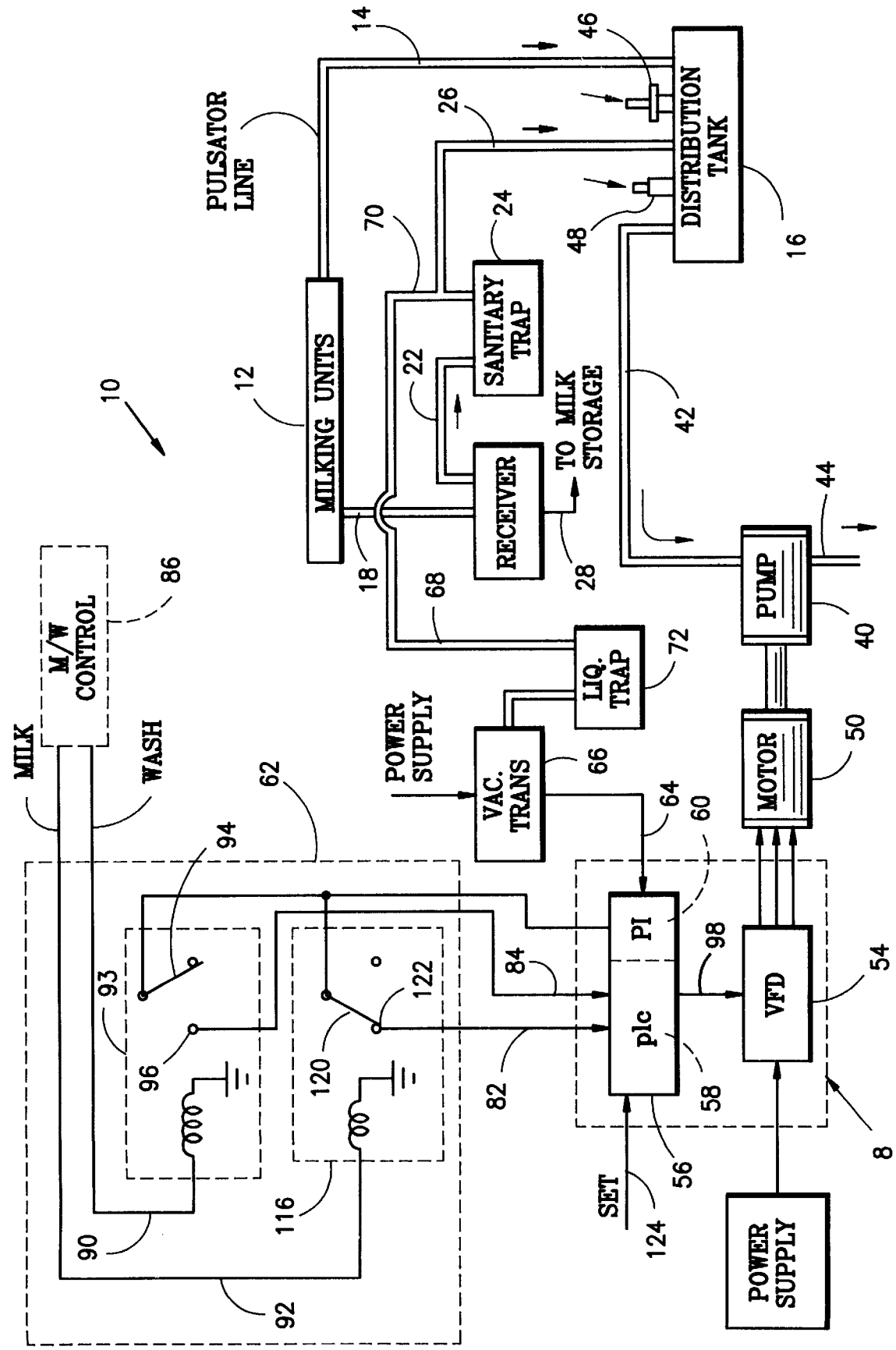

VACUUM LEVEL CONTROL SYSTEM USING VARIABLE FREQUENCY DRIVE

BACKGROUND OF THE INVENTION

The present invention relates, in general, to a vacuum control system for use in connection with a conventional milking system, and more particularly to a control system for regulating vacuum in a milking system both during a milking phase and during a washing phase.

A milking system is one of the most important components on a dairy farm, for it is used more hours per year than any other type of equipment. A key component of a milking system is a vacuum pump which is used to remove air from the milking system pipelines to create a partial vacuum. In a conventional vacuum milking system, the vacuum pump runs at full speed all the time, regardless of air demands, and a vacuum regulator is generally used to regulate the desired vacuum level by admitting external air, as required, when the vacuum level reaches a predetermined setting. The nominal vacuum levels normally used for milking usually are selected to be in the range from 13 to 15 inches of mercury, but vacuum fluctuations can occur in the system, as when a milking unit falls off the cow being milked, or when the system develops an air leak. It is essential that such fluctuations be limited to 0.6 inches of mercury from the nominal value to enable the vacuum system to meet ASAE standards, but this is difficult to achieve, for such incidents can cause an flow in the system to increase by 20 to 50 cu. ft. per minute over what is needed when the system is operating properly. To compensate for such variations, the size of the vacuum pump is selected to provide the desired vacuum level even when there is a large amount of leakage, and vacuum fluctuations are compensated by the vacuum regulator. Thus, for example, a vacuum pump operates at a constant rate sufficient to maintain a predetermined vacuum level in a reservoir even under leakage conditions, and a vacuum regulator connected to the reservoir admits air as required to control the vacuum level.

In such prior systems, if there is an increase in air flow through the milking system, air flow through the vacuum regulator is reduced so that the reservoir maintains the required vacuum level in the milking line. Ideally, in such systems, increases in the air flow in the milking system and should result in decreases in the air flow through the regulator, and these should be about equal to cancel each other and to maintain vacuum equilibrium in the reservoir. The problem with this arrangement is that only a small portion of the vacuum pump capacity is actually needed for milking, with majority of the air flow passing through the regulator. In such arrangements, the capacity of the vacuum pump always exceeds the capacity needed to milk cows or to wash the milking system, and the pump always runs at full speed and full load, regardless of the actual need for vacuum.

A recent improvement over the foregoing conventional system is described in U.S. Pat. No. 5,284,180 which discloses a system for varying the speed of a vacuum pump to maintain the required vacuum level and stability in the system. In this patent, a vacuum level controlling system utilizes a two-level controller combined with an adjustable speed motor drive for the pump. However, the system described in this patent is designed to provide a slow response, adjustable speed drive for a vacuum system for use during milking, and does not provide a specific control system for use during milk pipeline washing.

There is, therefore, a need for an automatic control system for a vacuum pump in a milking system for reducing electrical energy during a milking phase of operation, and to further control the vacuum pump during a milk pipeline washing phase, with both controls being integrated to provide an improved vacuum control system which will meet the needs of modern dairy farms.

SUMMARY OF THE INVENTION

It is, therefore, an object of the present invention to provide a vacuum controller which will regulate the vacuum level for a milking phase in a milking system.

It is another object of the invention to provide a vacuum controller which will regulate the vacuum level for a washing phase in a milking system.

Another object of the invention is the provision of a vacuum controller which is selectable to regulate the vacuum level for either a milking phase or a washing phase in a milking system.

It is a further object of the present invention to provide a vacuum level controller which will reduce the electrical energy required for operating a milking system while maintaining vacuum stability within a required range during the milking phase of a milking system.

Another object of the invention is the provision of a control method for regulating the speed of a vacuum pump during both a milking phase and a pipeline washing phase of a milking system to satisfy the air flow demands of both phases.

A further object of the invention is the provision of a vacuum level control system which integrates cow-milking and milk pipeline washing phases.

A further object of the invention is the provision of an automatic vacuum level control system incorporating a mechanism to release vacuum levels that exceed predetermined settings to prevent excessive vacuum in a milking system.

A still further object of the invention is to control the vacuum level of a milking system by artificially injecting air into the system to adjust the minimum speed of the pump used to supply vacuum to the milking system.

It is another object of the invention to provide a vacuum level controller for a milking system which is capable of regulating various types of vacuum pumps, including both vane and blower pumps.

Another object of the invention is the provision of an automatic vacuum level controller in a milking system which incorporates a vacuum sensor which is protected from contamination.

Briefly, the present invention relates to the provision of an automatic milking system having integrated, selectable milking and washing phases, and which incorporates a low-energy-consuming automatic vacuum pump speed control for maintaining selected vacuum levels in the system. The milking system incorporates a vacuum pump which is driven by a 3-phase induction motor which is, in turn, energized by an automatic vacuum level control incorporating control circuit and a variable frequency drive (VFD) circuit. An integrator serves as an interface between a milk/wash controller, where the operator selects the operational phase of the system, and the automatic vacuum level control. The control circuit includes a proportional controller and a programmable logic controller (plc) which is set to establish desired operating parameters and which responds to feedback signals from a vacuum transducer connected to a vacuum line in the milking system to maintain the desired vacuum level. The proportional controller preferably is a proportional/integral (PI) controller which supplies a control signal to the variable frequency drive circuit in accordance with selected milking and washing vacuum control parameters.

The vacuum level control is commercially available as the Magnetek GPD 505 variable frequency controller obtained from Magnetek Drives and Systems, 16555 West Ryerson Road, New Berlin, Wis. 53151. The PI controller portion of the control provides appropriate signals for regulating the speed of the drive motor by selecting an appropriate proportional or integral speed controlling method based on the operational phase (milking or washing) and the operating parameters selected for the system. The PI controller responds to the vacuum transducer feedback signal to produce and maintain a speed control frequency signal for the variable frequency drive which then regulates the speed of the motor and the vacuum pump in accordance with the control frequency signal.

The feedback vacuum transducer is connected through a feedback vacuum line to a milking system vacuum line to monitor the vacuum level in the milking system. A liquid trap may be provided in the feedback vacuum line to protect the vacuum transducer from any liquid contamination to thereby provide a clear path for changes in the system vacuum level to reach the feedback transducer.

The vacuum pump is connected to, and pumps air out of, a distribution tank which, in turn, provides the vacuum source for the milking system. Vacuum lines are connected from the distribution tank to the system, such lines including a pulsator air line or lines for operating individual milking units, and one or more main air lines connected to a receiver tank which receives milk from the milking units.

In addition to the automatic vacuum level control circuit, a conventional vacuum regulator is connected to the milking system, preferably to a main air line or to the distribution tank and plays an important role from a safety point of view. Although a low vacuum level may slow down the milking process in a vacuum milking system, it does not present a danger to the cows; however, an excessively high vacuum level may injure them. Accordingly, for safety the vacuum regulator is provided to limit the maximum vacuum in the milking system to a value which is about ½ inch to 1 inch of mercury above the desired setting for the system during the milking phase. Such a regulator is also necessary since each time the system is started, the possibility of a vacuum level overshoot exists.

The integrator, which is connected to the vacuum level control circuit, interprets an electrical signal from a conventional milk/wash controller, which is part of the milking system, and enables the vacuum level control to set the corresponding vacuum system parameters required for the selected milking or washing phase. The integrator includes a plurality of relay switches which produce corresponding input signals to the vacuum level control. In one configuration the integrator indicates a milking phase to the vacuum level control and the PI controller is enabled to respond to a feedback signal and to a milking vacuum level set signal to control the speed of the pump motor so as to produce the set milking vacuum level. In another configuration, the integrator indicates the washing phase, and the PI controller responds to the feedback signal and a washing vacuum level set signal to control the speed of the pump motor to produce the set washing vacuum level. Alternatively, the PI controller can produce a constant speed for the vacuum pump motor in the washing phase, without regard to the vacuum feedback or to a set level. In this latter case, the vacuum level in the system would be controlled by the vacuum regulator, which admits air to the system at a preset vacuum level, usually ½ to 1 inch of mercury above milking level.

An air bleeder device may also be provided at a convenient location such as on the distribution tank or on the main air line for the system when a minimum vacuum pump speed must be maintained. For example, at very low speeds, a rotary vane vacuum pump may produce undesired clatter, which may reduce the life of the pump. To eliminate this problem, the pump speed must be increased to a certain minimum level, and this is done by introducing a fixed small flow of air into the system through the air bleeder. This air flow tends to reduce the vacuum, and the reduction is sensed by the transducer to cause the pump speed to increase by an amount sufficient to compensate for the bleeder air flow. This air bleed thereby causes the pump to operate at a fixed minimum speed, thus overcoming the clatter problem. Similarly, some pumps require a minimum speed for proper lubrication and the bleeder device can be set to cause the vacuum transducer to increase the speed of the drive motor, and thus of the pump, until the required minimum rpm is attained. The air bleeder device is adjustable, therefore, to provide a minimum pump speed, as opposed to the pneumatic controller which limits the maximum vacuum in the distribution tank.

BRIEF DESCRIPTION OF THE DRAWINGS

The foregoing, and additional objects, features and advantages of the present invention will become apparent to those of skill in the art from the following detailed description of a preferred embodiment thereof, taken in conjunction with the accompanying drawing in which the single FIGURE illustrates in diagrammatic form a preferred vacuum level control system in accordance with the present invention.

DETAILED DESCRIPTION OF THE INVENTION

Turning now to more detailed consideration of the present invention, there is illustrated in the figure a vacuum level control 8 for providing a selected vacuum level to a milking system 10 which includes one or more milking units 12. The milking units are conventional units for milking cows, and are operated by a pulsator air line 14 connected to a vacuum distribution tank or header 16. The milking units are driven by the vacuum on the pulsator line 14, and milk is delivered by way of milk line (or lines) 18 to a receiver 20. The receiver is maintained under vacuum by way of an air line 22, sanitary trap 24, and a main air line 26 leading to the distribution tank 16, the receiver being maintained at substantially the same vacuum level as the vacuum in the distribution tank. Receiver 20 is also connected by way of outlet line 28 to a suitable storage tank (not shown) which receives and stores the milk. The sanitary trap 24 is intended to prevent milk and wash water from being drawn into the distribution tank 16 by the vacuum in line 26.

A vacuum pump 40 is connected to the distribution tank 16 by way of vacuum line 42 and exhausts to atmosphere by way of line 44. Pump 40 is driven to draw air from the tank 16 and exhaust it to atmosphere to produce a vacuum in the distribution tank at a level which is determined by the speed of rotation of the pump, by the amount of air which flows into the distribution tank from the milking units 12 either through line 14 or through receiver 20 and lines 18, 22 and 26, and by any air leaks in the system. In addition, under certain conditions air may be admitted to the distribution tank in controlled amounts through a conventional vacuum regulator 46 and/or a bleed valve 48.

Normally, the vacuum level in a milking system is fairly stable during the milking phase of operation and accordingly the pump is usually driven at a relatively stable rate. However, if one or more of the milking units should be removed, or should fall off of a cow being milked, or if some fault should occur in one of the vacuum lines, excess air will be admitted to the system, requiring quick and precise changes in the operation of the pump so as to maintain the vacuum at its preselected, or nominal level. In addition, when it is desired to wash the milking units 12, the milk delivery line 18, the receiver 20, and other parts of the system during a washing phase of operation, a high rate of air flow through the milking system is required, which the pump 40 must be able to deliver in order to maintain system operation. In order to maintain the desired vacuum level during both a milking phase of operation and during a washing phase of operation, the pump 40 is driven by a variable pump speed motor 50.

The speed of pump motor 50 is regulated, in accordance with the present invention, by the vacuum control 8, which includes a variable frequency drive circuit 54 which is, in turn, controlled by an automatic vacuum level control circuit 56 which incorporates a programmable logic controller (plc) 58 and a conventional proportional/integral (PI) controller 60. The plc 58 receives digital command signals from an integrator 62 (to be described) and is programmable to establish desired vacuum level parameters for the milking system. The plc 58 provides an input to the PI 60, which also responds to a feedback signal on line 64 provided by a vacuum transducer, or sensor, 66. The sensor monitors the vacuum level in the milking system 10 and produces a corresponding electrical feedback signal on line 64. The milking system vacuum level is detected through a vacuum feedback line 68 which is connected to the milking system main air line 26 at a sensor connector 70. Line 68 may be connected to transducer 66 through a liquid trap 72 which prevents liquid or other contaminants which may be in the vacuum system from blocking the feedback path and thus adversely affecting the sensitivity and accuracy of sensor 66.

Integrator 62 is connected to the plc 58 by way of lines 82 and 84, and receives input signals from a milk/wash controller, generally indicated at 86, via lines 90 and 92. Controller 86 is a part of the existing milking system 10, and provides an output on line 90 when a washing phase is selected, and an output on line 92 when a milking phase is selected for the system.

The washing phase signal on line 90 is supplied to a relay 93 in integrator 62. The relay includes a switch arm 94 which is operable, upon energization of relay 93, to close contact 96 and to supply a digital electrical command signal by way of line 84 to the plc controller 58. Controller 58 responds to the command signal on line 84 to produce speed control signals on line 98 to set the VFD 54 to a value which will drive the motor 50 and thus the pump 40 to produce a wash vacuum level in the milking system 10. This wash level is selectable, and is usually greater than the milking level by about ½ to 1 inch of mercury, and is regulated by the conventional regulator 46. If desired, the PI controller 60 can be set to a desired vacuum level by the plc controller, with the feedback signal on line 64 being used to maintain the selected wash vacuum level by regulating the speed of pump motor 50.

The milking phase for the system 10 is selected at the milk/wash controller 86 by a signal on line 92 which is supplied to a second relay 116 having a switch arm 120. The relay switch arm 120 is operable, upon energization of relay 116, to close a contact 122 and to supply a corresponding digital electrical command signal by way of line 82 to the plc controller 58. The plc controller 58 responds to this signal and in conjunction with the PI controller 60, produces on line 98 speed control signals which will set the VFD 54 to a value which will drive the motor 50 at speeds required to produce and to maintain a preselected vacuum level in the milking system 10. Signals on lines 82 or 84 select the vacuum level reference for the milk or wash phases, respectively, which will establish the desired speed for motor 50. These vacuum level references are set by a keypad (not shown) connected to a set line 124 for the plc controller 58, and can provide a fixed speed for the motor. Alternatively, the plc controller can be programmed to cause the PI controller to respond to the vacuum feedback signal on line 64 to provide a variable motor speed which will maintain a desired milking or washing vacuum level in system 10.

In operation, a milking or washing process is initiated by an operator at the milking system milk/wash control associated with integrator 62. A vacuum of 13" of mercury, for example, can be preset in the PI controller 60 by a "set" input on line 124 which produces a corresponding vacuum reference value in the controller. Upon activation of the vacuum system, the controller compares this preset reference value to the output signal produced on line 64 by the vacuum sensor 66. If, for example, the sensor indicates a lesser vacuum than the preset reference value, the PI controller will increase the speed of the motor 50 and thus of pump 40 through the variable frequency drive 54. The pump draws air out of the milking system and establishes the preset vacuum level in the milking system. If the sensed vacuum is higher than the preset value, the PI controller will slow motor 50. The controller continuously monitors the vacuum level and establishes the appropriate speed for the motor, so that the motor runs at the speed needed to maintain the set vacuum level.

The vacuum regulator 46 is desirable during system start up in the milking phase, for the PI controller has a high gain which will produce an initial high speed in motor 50 and pump 40. This high speed can result in vacuum overshoot in the milking equipment, so the vacuum regulator 46 is preferably set at a level about ½" to 1" of mercury higher than the nominal vacuum level set in controller 60. The regulator will automatically open and allow air to bleed into the system if the vacuum level exceeds its setting, thereby preventing excessive and damaging vacuum levels.

As the pump 40 operates to increase the vacuum level in the milking system, the vacuum is sensed at, for example, connector 70 in main air line 26, the sensing point preferably being near the receiver 20. This vacuum level is carried by feedback line 68 to the sensor 66 which converts the sensed vacuum level into a signal on line 64 which is fed into the PI controller 60 for comparison to the reference signal previously established by the plc controller 58. The controller 60 then operates to vary the frequency and voltage supplied to motor 50 by the variable frequency drive 54 in accordance with the difference between the reference and sensed values. In this way, the speed of the motor 50 is gradually reduced as the vacuum level builds, and when the desired level is reached the motor will operate at the speed needed to maintain the vacuum in tank 16 and in the milking system at the preset value.

As noted above, the liquid trap 10 in the feedback line prevents liquid or other contaminants from interfering with the feedback line and ensures maintenance of a clear path between the sensing point 70 and the transducer 66. The feedback line can be a ½" diameter pipe, for example.

At the end of the milking phase, the control signal on wire 92 is turned off at the milk/wash controller in the milking system, stopping the motor 50 and pump 40 and allowing the vacuum in the system to dissipate. Thereafter, or alternatively, the operator may select the washing phase for the system by a control signal on wire 90. This activates relay 93 to provide a command signal by way of line 84 to the plc controller 58 to permit a different operating parameter to be established for the motor 50 than was used for the milking phase. In one mode of the wash operation, the plc controller 58 is set to cause the motor 50 and pump 40 to run at a fixed preset speed, without regard to the feedback signal produced by transducer 66. During this mode, the vacuum level in the system is controlled by the vacuum regulator 46 which, as noted above, is set at ½" to 1" of mercury higher than the vacuum level required for milking.

In another mode of the wash operation, the plc controller is set to a selected vacuum level by an input at line 124. This set value is compared in the PI controller 60 to the output produced by vacuum transducer 66 to vary the motor speed to provide a washing vacuum level at the selected value, instead of the value established by vacuum regulator 46.

It has been found that when certain types of pumps are used; for example, rotary vane pumps, low speed operation will result in unwanted noise and perhaps excessive wear. This can be reduced by increasing the pump running speed, but such an increase will raise the vacuum above the desired level. In order to compensate for this increased speed, the adjustable bleeder valve 48 is provided to allow a compensating flow of air into the distribution tank. Such a bleeder valve may include an air filter and suitable connecting hoses, as required. In operation, the bleeder valve is adjusted to admit a small amount of air to reduce the vacuum level. This reduction is sensed by transducer 66, causing control 8 to increase the motor speed as amount sufficient to restore the desired vacuum level. This is repeated until the motor speed is increased enough to eliminate the noise.

The present invention provides a unique integration of a feedback control milking system with a controllable washing system to provide a two-phase controller for maintaining vacuum stability under both milking and washing conditions. During the milking phase, the vacuum level is controlled and vacuum stability is maintained by the vacuum level controller 8 which includes with a variable frequency drive and a fast response PI controller. This type of control causes the pump speed and thus its pumping rate to closely match the rate of air entering the system, thereby permitting the pump to operate at the necessary speed during the milking phase while maintaining the vacuum at the desired level. During the washing phase for the system, the pump and motor can be operated at a higher speed which may be a preset value or may be regulated through the PI controller.

The system utilizes conventional vacuum regulator which serves as a relief valve during the milking phase and as a vacuum controller during washing phase with preset speed. The system may be similar to conventional systems during washing and testing phases, where the vacuum pump is operated at a fixed preset speed and where excessive air is admitted through the vacuum regulator, but differs from conventional systems in that it is also capable of operating as a feedback system during the milking, washing and testing phases.

The system is also capable of accommodating vacuum pumps that must operate at a minimum speed that is greater than would normally be required to maintain the vacuum at the preset milking level. This is accomplished by providing a bleeder valve in the system which may be set to provide for the additional speed of the vacuum pump. Finally, the system provides a feedback line which incorporates a liquid or contaminant trap to protect the vacuum transducer for improved accuracy in the system.

Although the invention has been described in terms of preferred embodiments, variations and modifications may be made without departing from the true spirit and scope thereof, as set forth in the following claims.

What is claimed is:

1. A controller for a vacuum milking system having a milking phase and a washing phase comprising:

a vacuum distributor;

a vacuum pump connected to said distributor and operable to remove air therefrom to produce a vacuum therein;

a motor capable of operating at variable speed connected to drive said vacuum pump;

a vacuum level control circuit having at least first and second presettable vacuum level reference signals, said control circuit including a variable frequency drive connected to said variable speed motor to control the speed of the motor;

a feedback vacuum sensor connectable to a milking system and to said vacuum level control circuit to produce a feedback signal in response to the vacuum level in said milking system; and an integrator connected to said vacuum level control circuit to switch said control circuit to a milking phase or to a washing phase, said control circuit when in said milking phase providing a variable speed motor control output in response to a difference between said feedback signal and said presettable vacuum level reference signal to operate said motor and said vacuum pump at a speed selected in accordance with the sensed vacuum level in the milking system and when in said washing phase selectably providing a fixed preset motor control output to drive said motor and said vacuum pump at a fixed speed or providing a variable motor control output to drive said motor and said pump at a speed selected in accordance with the sensed vacuum level in the milking system.

2. The controller of claim 1, further including an air regulator connected to said distribution tank to provide a safety vacuum limit when said system is in its milking phase and to provide a fixed vacuum control when said system is in its washing phase.

3. The controller of claim 2, further including a bleeder valve connected to said distribution tank to produce a predetermined air leakage into said tank to provide a minimum speed limit for said drive motor and pumps.

4. A controller comprising:

a vacuum distributor;

a vacuum milking system having a milking phase and a washing phase, said milking system being connected to said distributor;

a vacuum pump connected to said distributor and operable to remove air therefrom to produce a vacuum therein;

a motor capable of operating at variable speed and connected to drive said vacuum pump;

a variable frequency drive connected to said motor to control the speed of the motor;

a vacuum level control circuit producing a control output signal for controlling said variable frequency drive;

a feedback vacuum sensor connected to said milking system and to said vacuum level control circuit to produce a feedback signal in response to the vacuum level in said milking system; and at least one vacuum level reference signal connectable to said vacuum level control circuit to shift said control circuit to a milking phase or to a washing phase, said control circuit when in said milking phase providing control output signals in response to a difference between said feedback signal and said at least one vacuum level reference signal to operate said motor and said pump at a speed selected in accordance with the sensed vacuum level in said milking system and when in said washing phase providing a fixed preset control output signal to drive said motor and said vacuum pump at a fixed speed.

5. The controller of claim 4, further including an air regulator connected to said distribution tank to provide a safety vacuum limit when said system is in its milking phase and to provide a fixed vacuum control when said system is in its washing phase.

6. The controller of claim 5, further including a bleeder valve connected to said distribution tank to produce a predetermined air leakage into said tank to provide a minimum speed limit for said drive motor and pumps.

7. The controller of claim 4, wherein said at least one vacuum reference signal includes first and second vacuum level reference signals selectable to produce said milking phase or said washing phase.

8. The controller of claim 7, wherein said first and second vacuum level reference signals are produced by an integrator circuit.

9. A controller for a vacuum milking system, including:
a vacuum distributor connectable to the milking system;
a vacuum pump connected to said distributor and operable to produce a vacuum therein;
a variable speed motor connected to drive said vacuum pump;
a controllable variable frequency drive connected to said motor to regulate the speed of the motor;
a vacuum level control circuit shiftable between a milking phase and a washing phase and producing corresponding control output signals for controlling said variable frequency drive;
a vacuum sensor responsive to the vacuum level in the milking system for supplying a feedback signal to said control circuit; and
a vacuum level reference signal connected to said control circuit for shifting said control circuit to a milking phase or a washing phase, said control circuit providing control output signals in response to differences between said feedback signal and said reference signal to drive said motor and said vacuum pump at a variable speed selected for said milking phase and a fixed speed for said washing phase.

* * * * *